United States Patent
Schumacher et al.

(10) Patent No.: US 10,066,935 B2
(45) Date of Patent: Sep. 4, 2018

(54) LASER DEVICE AND LASER BEAM DETECTOR FOR DETECTING LIGHT OF A LASER DEVICE

(71) Applicant: Trimble Kaiserslautern GmbH, Kaiserslautern (DE)

(72) Inventors: Lars Schumacher, Relsberg (DE); Karsten Woll, Hirschhorn (DE)

(73) Assignee: Trimble Kaiserslautern GmbH, Kaiserslautern (DE)

( * ) Notice: Subject to any disclaimer, the term of this patent is extended or adjusted under 35 U.S.C. 154(b) by 126 days.

(21) Appl. No.: 14/601,460

(22) Filed: Jan. 21, 2015

(65) Prior Publication Data

US 2016/0209209 A1 Jul. 21, 2016

(51) Int. Cl.
- *G01C 3/08* (2006.01)
- *G01B 11/27* (2006.01)
- *G01C 15/00* (2006.01)

(52) U.S. Cl.
CPC .......... *G01B 11/272* (2013.01); *G01C 15/006* (2013.01)

(58) Field of Classification Search
CPC ............................ G01B 11/272; G01C 15/006
See application file for complete search history.

(56) References Cited

U.S. PATENT DOCUMENTS

| | | | |
|---|---|---|---|
| 4,240,208 A | 12/1980 | Pehrson | |
| 6,055,046 A | 4/2000 | Cain | |
| 6,137,567 A | 10/2000 | Ohoka et al. | |
| 6,314,650 B1 | 11/2001 | Falb | |
| 6,630,993 B1 | 10/2003 | Hedges et al. | |
| 6,693,706 B2 | 2/2004 | Kahle et al. | |
| 7,394,527 B2 | 7/2008 | Essling et al. | |
| 2007/0024845 A1* | 2/2007 | Essling | G01C 15/002 356/141.4 |
| 2008/0180681 A1* | 7/2008 | Digonnet | G01C 19/722 356/477 |
| 2010/0007513 A1* | 1/2010 | Horky | G01C 15/002 340/12.22 |
| 2013/0111770 A1 | 5/2013 | Westermeyer et al. | |
| 2013/0298413 A1* | 11/2013 | Kehl | G01C 15/004 33/228 |

FOREIGN PATENT DOCUMENTS

| | | |
|---|---|---|
| DE | 198 41 815 | 4/1999 |
| DE | 100 59 240 A1 | 2/2002 |

(Continued)

*Primary Examiner* — Samantha K Abraham
(74) *Attorney, Agent, or Firm* — Kilpatrick Townsend & Stockton

(57) ABSTRACT

The present invention relates to a laser device for supporting work on a construction site and a laser beam detector for detecting light of a laser beam rotating around a rotation axis of a laser device. There is a need that the detector is able to identify the laser device which emitted the light that the detector detects. This can be achieved by a laser device comprising a laser unit configured to emit a laser beam; an optical element arranged to rotate the laser beam around a rotation axis; and a transmitter configured to transmit a communication signal over an interface to a receiver of a laser beam detector, wherein the communication signal provides information about a rotation pattern of the rotating laser beam.

10 Claims, 3 Drawing Sheets

(56) References Cited

FOREIGN PATENT DOCUMENTS

| | | |
|---|---|---|
| DE | 10 2011 085 761 A1 | 5/2013 |
| EP | 2 199 739 A1 | 6/2010 |
| EP | 2 453 204 A1 | 5/2012 |
| EP | 2 781 879 A1 | 9/2014 |
| WO | 2006/048007 A1 | 5/2006 |
| WO | 2009/154625 A1 | 12/2009 |

\* cited by examiner

LASER DEVICE AND LASER BEAM DETECTOR FOR DETECTING LIGHT OF A LASER DEVICE

TECHNICAL FIELD

The present invention relates to a laser device and a laser beam detector as well as corresponding methods, and in particular to a laser device for supporting work on a construction site and a laser beam detector for detecting light of a laser beam rotating around a rotation axis of a laser device.

BACKGROUND

On construction sites various types of measuring instruments are used for measuring distances and angles between objects. Several conventional measuring instruments, such as construction lasers or surveying instruments, use a laser light source for measuring a distance, for measuring a position of an object, for indicating a direction or indicating a plane in space.

Special measuring instruments, such as a grade laser, a levelling apparatus or laser levelling apparatus, which functions are usually included in a construction laser, measures, for example, with the aid of a leveling rule, differences in height and establishes height horizons. For example, a levelling apparatus comprises a targeting telescope which, using a level or a pendulum compensator, can be oriented perpendicular to the plumb line direction. In addition to the measurement of positions, particularly differences in height, horizontal planes or vertical planes or sloped planes can be established, for example by rotating a laser beam.

Different detectors based on the photo detection of the emitted laser light of the measuring instruments are known. For example, WO 2006/048007 A1 describes a light beam receiver for analyzing the reception of light beams by means of a plurality of light beam detector elements and integrators for light beam element-based signals as well as a light conducting rod. Other detectors include a positioning device for detecting light of a fan-shaped laser beam described in WO 2009/154625 A1.

On large construction sites multiple laser systems each comprising a laser device emitting laser light and a laser beam detector may be employed at the same time. Therefore, there is a problem that a detector may be hit by laser light of different laser devices, i.e. by a laser device which is actually not associated with the detector and may then be erroneously used as a reference.

Accordingly, there is a need that a detector is able to identify the laser device which emitted the light that the detector detects. In other words, it is desirable that the detector recognizes its partnering laser device, the pair forming a corresponding laser system.

Further, since potentially several laser systems of laser devices and detectors from the same manufacturer can be employed on the same construction site, it is desired to be able to differentiate between the laser systems and provide an individual characteristic, such as a "fingerprint", for each system.

SUMMARY

According to an embodiment, a laser device for supporting work on a construction site comprises a laser unit configured to emit a laser beam. Further, the laser device comprises an optical element arranged to rotate the laser beam around a rotation axis and a transmitter configured to transmit a communication signal over an interface, e.g. a radio interface, to a receiver of a laser beam detector. The communication signal provides information about a rotation pattern of the rotating laser beam. Accordingly, information about a rotation pattern resulting from the optical element rotating the laser beam can be provided over an interface to a laser beam detector so that the laser beam detector may identify the laser device by its rotation pattern.

According to another embodiment, the laser device further comprises a controller configured to control the rotation pattern of the laser beam by increasing or decreasing the rotation speed of the optical element. Accordingly, the rotation speed can be changed so that the same laser device may use different identifying rotation patterns at different times to make itself clearly distinguishable from other laser devices with other rotation patterns.

According to another embodiment, the communication signal provides at least one of the present rotation speed of the optical element, the sign of an acceleration of the rotation, a point in time at which the next change of sign of an acceleration of the rotation occurs, and a maximal or a minimal rotation speed at which the next change of sign of an acceleration of the rotation occurs. Accordingly, different characteristics in the rotation pattern can be signaled via the communication signal to the laser beam detector to enable the provision of an individualized characteristic distinguishing from other rotation patterns.

According to another embodiment, the transmitter is configured to continuously transmit the communication signal over the interface to the receiver while the laser beam is rotating. Accordingly, it is possible that the rotation pattern is customized by continuously changing the rotation speed so that a complex rotation pattern with continuously varying rotation speed can be provided enabling an unambiguous association of the detected light of a laser beam with a laser light emitting laser device.

According to another embodiment, the optical element is controlled to change its rotation speed and thus the rotation speed of the rotating laser beam to a predetermined value. For example, the optical element is controlled to increase the rotation speed of the rotating laser beam to a first predetermined value and then to decrease the rotation speed to a second predetermined value. Accordingly, a rotation pattern can be detected, in which the rotation speed of the rotation laser beam reaches a predetermined value, which characteristic can thus be associated with the laser device comprising the optical element.

According to another embodiment, the laser device further comprises a random number generator configured to generate a random number and to adapt the rate of change of the rotation speed to the random number. Accordingly, by using a random number and by changing the rotation speed accordingly, i.e. adapt the rate of change of the rotation speed, randomly, a random rotation pattern can be generated and at the same time the information thereof transmitted over the interface so that a highly individualized rotation pattern renders it almost impossible to associate the wrong laser device to the laser beam detector.

Another embodiment of the invention relates to a laser beam detector for detecting light of a laser beam rotating around a rotation axis. The laser beam detector comprises a photo detector configured to output a detection signal when irradiated by laser light as well as a receiver configured to receive a communication signal from a transmitter of a laser device over an interface, wherein the communication signal provides information about a rotation pattern of a rotating laser beam. Further, the laser beam detector comprises a determinator configured to determine whether the laser light belongs to the laser beam emitted by the laser device by comparing a pattern effected by a sequence of detection signals from the photo detector with the information about the rotation pattern of the rotating laser beam provided by the communication signal. Accordingly, information about a rotation pattern resulting from the optical element rotating the laser beam can be provided over an interface to a laser beam detector so that the laser beam detector may identify the laser device by its rotation pattern.

According to another embodiment, the determinator of the laser beam detector is configured to continuously compare the pattern effected by, i.e. obtained from, the sequence of the detection signals with the information about the rotation pattern of the rotating laser beam provided by the communication signal in order to lock the laser beam detector on the laser device. Accordingly, by continuously comparing the pattern, quick changes in the rotation speed can be detected so that individualized and highly characteristic patterns, e.g. with random accelerations in the rotation, can be realized. In particular, it is highly unlikely that such a rotation pattern of the rotating laser beam is accidentally the same as a rotation pattern of a rotating laser beam of a different laser device.

According to another embodiment, the receiver of the laser beam detector is configured to continuously receive the communication signal over the interface from the transmitter while the laser beam is rotating. Accordingly, continuous changes in the rotation speed can be signaled over the interface, making the rotation pattern a very characteristic one.

According to another embodiment, the received communication signal provides at least one of the present rotation speed of the optical element, the sign of an acceleration of the rotation, a point in time at which the next change of sign of an acceleration of the rotation occurs, and a maximal or minimal rotation speed at which the next change of sign of an acceleration of the rotation occurs. Accordingly, different characteristics in the rotation pattern can be signaled via the communication signal to the laser beam detector to enable the provision of an individualized characteristic distinguishing from other rotation patterns.

According to another embodiment, the determinator of the laser beam detector is configured to derive at least one of the rotation speed of the rotating laser beam at a specific time and an acceleration of the rotation from the pattern effected by the sequence of detection signals, or to derive an increase in the rotation speed of the rotating laser beam to a first predetermined value and then a decrease in the rotation speed to a second predetermined value. Accordingly, a rotation pattern can be detected, in which the rotation speed of the rotation laser beam reaches a predetermined value, which characteristic can thus be associated with the laser device comprising the optical element carrying out the same rotations.

Another embodiment is directed to a laser system comprising a laser device with at least some of the above-mentioned features of a laser device and a laser beam detector with at least some of the above-mentioned features of a laser beam detector.

In a further embodiment, a method for supporting work on a construction site comprises emitting a laser beam by a laser unit of a laser device, rotating the laser beam around a rotation axis by an optical element; and transmitting a communication signal over an interface from the laser device to a receiver of a laser beam detector, wherein the communication signal provides information about a rotation pattern of the rotating laser beam.

In a further embodiment, a method for identifying light of a laser beam rotating around the rotation axis comprises detecting laser light irradiated on a photo detector; outputting from the photo detector of a detection signal triggered by the irradiated laser light; receiving a communication signal from a transmitter of a laser device over an interface, the communication signal providing information about a rotation pattern of the rotating laser beam; and determining whether the laser light belongs to the laser beam emitted by the laser device by comparing a pattern effected by a sequence of detection signals from the photo detector with the information about the rotation pattern of the rotating laser beam provided by the communication signal.

In a further embodiment, a program including instructions adapted to cause data processing means to control the operation of one of the above described methods is disclosed.

In a further embodiment, a computer readable medium is disclosed, in which a program is embodied, where the program is to make a computer execute one of the above methods.

Additional advantageous embodiments of the invention are disclosed in the claims and particularly in their combinations as well as in the detailed description below.

DETAILED DESCRIPTION

Preferred embodiments of the invention are described in reference to the figures. It is noted that the following description contains merely examples and must not be interpreted as limiting the invention.

Figure 1:
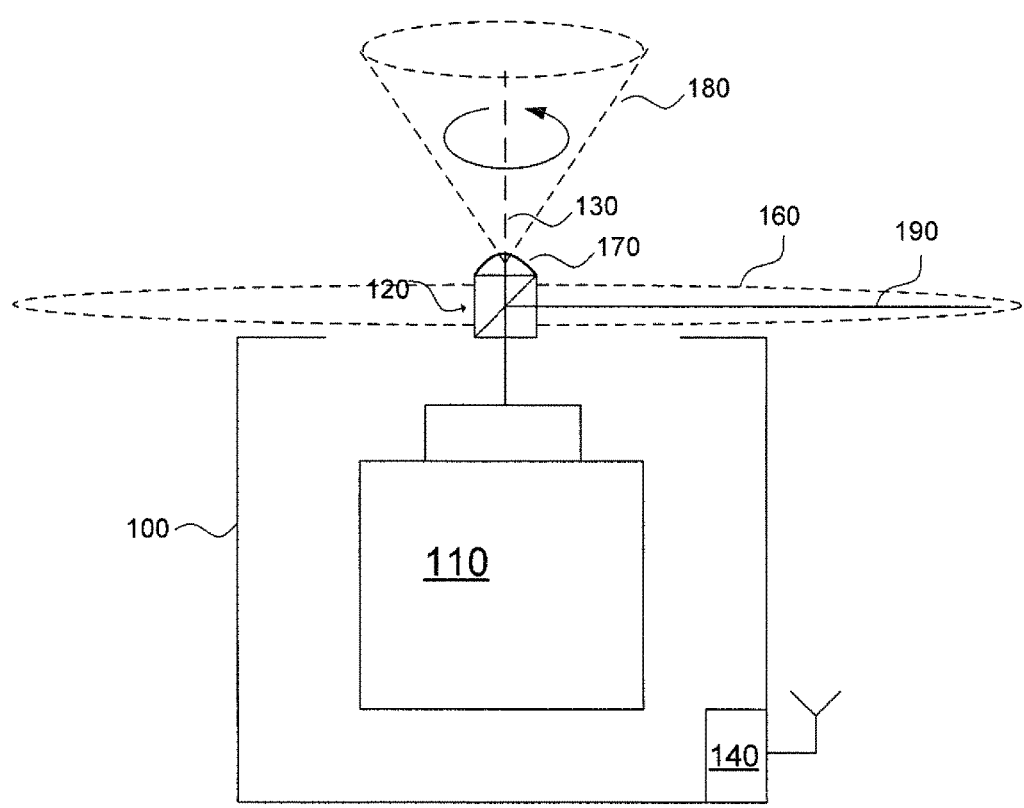
FIG. 1 illustrates a laser device of an embodiment.

FIG. 1 illustrates elements of a laser device 100 according to an embodiment of the invention. The laser device 100 may be a construction laser or rotation laser, e.g. level laser and grade laser, to be used on a construction site to indicate planes, such as a sloped plane or horizontal plane or vertical plane, or to indicate a direction or position. Specifically, the laser device 100 of FIG. 1 comprises a laser unit 110, an optical element 120 and a transmitter 140.

The laser unit 110 comprises a laser, preferably a semiconductor laser in the red/infrared range, and is configured to emit a laser beam, i.e. coherent light with basically the same wavelength emitted in the same direction.

The optical element 120 is arranged to rotate the laser beam emitted by the laser unit 110 around a rotation axis 130. For example, the optical element comprises a beam splitter, e.g. penta prism or other beam splitting cube, reflecting parts of the laser light in a direction perpendicular to the rotation axis and transmits parts of the laser light in the direction of the rotation axis. The ratio of deflected and transmitted light is dependent on the reflection/transmittance properties of the beam splitting cube.

Instead of a beam splitting cube, also a mirror or similar may be used to deflect the light. The laser light deflected perpendicular to the rotation axis 130 is indicated by reference sign 190. It is further indicated by reference sign 160 that when the optical element is rotated, the laser beam spans a plane to which the rotation axis 130 is perpendicular. In this mode of operation, horizontal or vertical planes can be optically generated to assist in the construction of walls and ceilings.

In another operation mode the light 130 transmitted through the beam splitting cube may be passed through a cylindrical lens so that the light becomes fan-shaped. Further, by rotating the fan-shaped laser beam a cone of light may be generated (for details see WO 2009/154625 A1). This mode may be used for easier detection of the center of the cone 180, i.e. the rotation axis. In this example, the rotation axis 130 is also the propagation axis of the light of the fan-shaped laser beam.

Different ways of achieving a rotation of the laser beam using an optical element are known to the skilled person. For example, the optical element, in this example the beam splitting cube, may be arranged on a support unit and rotated by an electromotor. An example of the mechanical arrangement is presented in US 2013/111770 A1 which is incorporated by reference.

Figure 5:
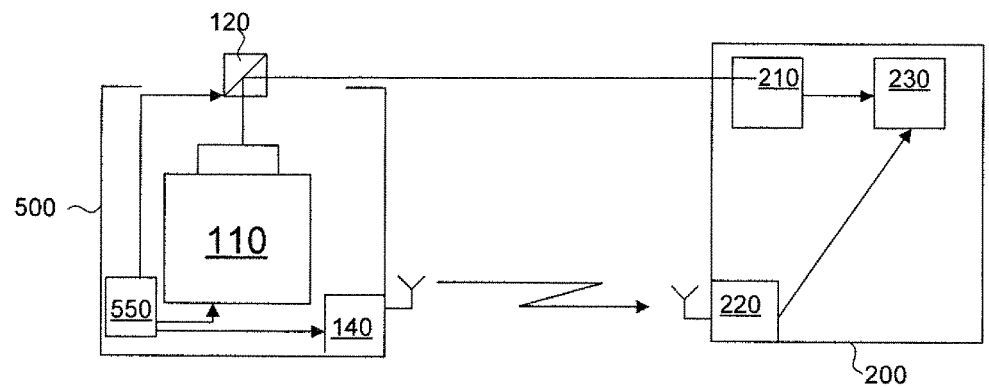
FIG. 5 illustrates a laser system comprising a laser device and a laser beam detector.

The transmitter 140 transmits a communication signal. The communication signal is transmitted over an interface to a receiver of a laser beam detector. An example of a laser beam detector will be discussed with respect to FIG. 2 and another example with respect to FIG. 5. As schematically illustrated in FIG. 1 and FIG. 5, the transmitter 140 may comprise an antenna forming a radio interface but it is not limited thereto.

The interface may be a radio interface or an optical interface depending on the type of transmitter. For example, the transmitter may be an infrared (IR) transmitter so that the IR transmitter transmits IR light over the IR interface to an IR receiver. Preferably, the transmitter is a radio transmitter and the interface, i.e. radio interface, uses an established wireless technology, such as Bluetooth or some kind of Wi-Fi, e.g. IEEE802.11. The advantage of transmitting the communication signal over a radio interface is that radio communication does not depend on a clear line of sight between the transmitter and the receiver.

In one example, the transmitter may be a transceiver for bidirectional communication. It may be advantageous to not only transmit a communication signal in only one direction but also receive an acknowledgement or non-acknowledgement from the receiver of the transmitted communication signal. Other functions are also conceivable, such as that the receiver requests the transmitter 140 of the laser device 100 to transmit information, such as information in a communication signal, upon request.

The communication signal especially provides information about a rotation pattern of the rotating laser beam emitted by the laser device 100. In a simple case, when the optical element is controlled to rotate the laser beam at 600 rotations per minute (rpm), the transmitter transmits a communication signal indicating that the rotation speed is 600 rpm. This communication signal is transmitted preferably over the above-mentioned radio interface, e.g. as a series of bits, and received at a receiver of a laser beam detector. The laser beam detector including the receiver will then know when detecting laser light impinging periodically 600 times per minute on a photo detector element that the laser light belongs to the laser device 100. Details about the laser beam detector will be discussed below with respect to FIG. 2.

Figure 3:
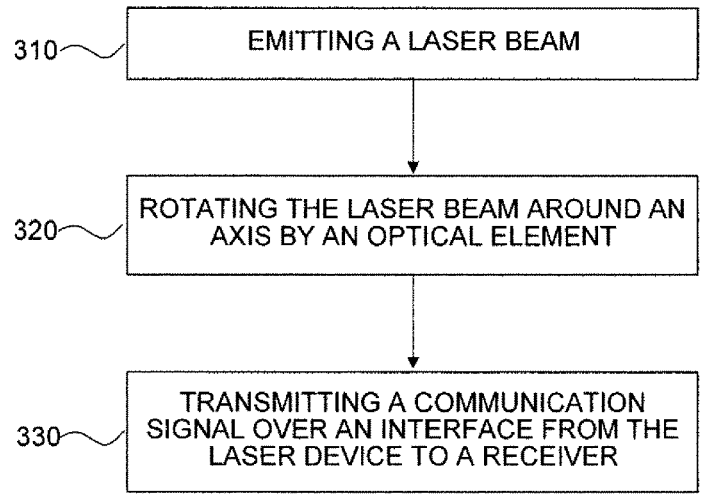
FIG. 3 illustrates steps of a method for supporting work on a construction site.

A summary of the operation of the laser device 100 is given in the following by referring to FIG. 3 illustrating steps of a method for supporting work on a construction site. It is needless to say that the method of FIG. 3 may be carried out by the laser device 100.

In a first step 310 of the flowchart depicted in FIG. 3, when the operation is started, a laser beam is emitted. The laser beam is emitted by the laser unit 110, which may comprise a semiconductor laser.

In a second step 320 the laser beam is rotated around the axis 130, wherein the optical element 120 defines the direction of the laser beam, namely whether the beam is deflected perpendicular to the rotation axis, such as indicated by reference sign 190 and/or is transmitted without deflection in a direction of the rotation axis 130 (see FIG. 1).

In a third step 330, the above-mentioned communication signal is transmitted over the interface from the laser device to the receiver. In particular, the communication signal is continuously transmitted so that the receiver can be continuously updated with new information about the rotation pattern, e.g. if and how the rotation pattern changes.

In the example above, a simple rotation pattern of 600 rpm was considered. It is understood that if several laser devices and laser beam detector pairs are used on a construction site and the typical rotation speed is between 540 and 640 rpm, the "fingerprint" of the 600 rpm pattern might not be very unique and there is a danger that two laser devices use a similar rotation speed. Therefore, the "fingerprint" of the laser device 100 may be further enhanced by changing the rotation pattern while the laser beam is rotating.

For example, the rotation pattern of the laser beam is controlled, e.g. by a laser device controller, such as controller 550 of FIG. 5 which will be discussed in detail further below, to increase or decrease the rotation speed of the optical element and thus also of the laser beam. For example, the rotation speed may be ramped up from 560 rpm to 640 rpm in a certain time span and/or ramped down from 640 rpm to 560 rpm in the same or different time span. A detailed example thereof will be described later with respect to FIG. 6.

To inform the laser beam detector 200 of the change in the rotation speed, i.e. the acceleration of the rotation, which can be positive or negative (deceleration), it is possible to provide the receiver of the laser beam detector with suitable information in the communication signal.

For example, the communication signal provides at least one of the present rotation speed of the optical element, the sign of an acceleration of the rotation, a point in time at which the next change of sign of an acceleration of the rotation speed occurs, and a maximal or minimal rotation speed at which the next change of sign of an acceleration of the rotation occurs. It is clear that it is not necessary to transmit all of these information elements and particularly not transmit them at the same time in the same communication signal, since not all information is needed and multiple communication signals can be used to convey the needed information.

For example, the communication signal may include the present rotation speed, such as 560 rpm and include the information that at time t1 640 rpm is to be reached. This information is for example sufficient if the rotation speed of the optical element 120 is continuously (linearly) increased from 560 rpm to 640 rpm in the time from t0 to t1, which may be controlled by the controller driving the optical element 120 accordingly.

In one example, the more often the rotation speed is changed, i.e. the more complex the rotation pattern is, the more often the communication signal is to be transmitted over the interface, preferably the radio interface. Therefore, it is advantageous to continuously transmit the communication signal, e.g. every 100 ms or every time the controller indicates a change of the rotation speed to the rotating optical element, over the interface to the receiver while the laser beam is rotating. Accordingly, it can be ensured that even complex patterns can be detected at the laser beam detector and most importantly associated with the correct laser device sending out the detected laser light.

Figure 2:
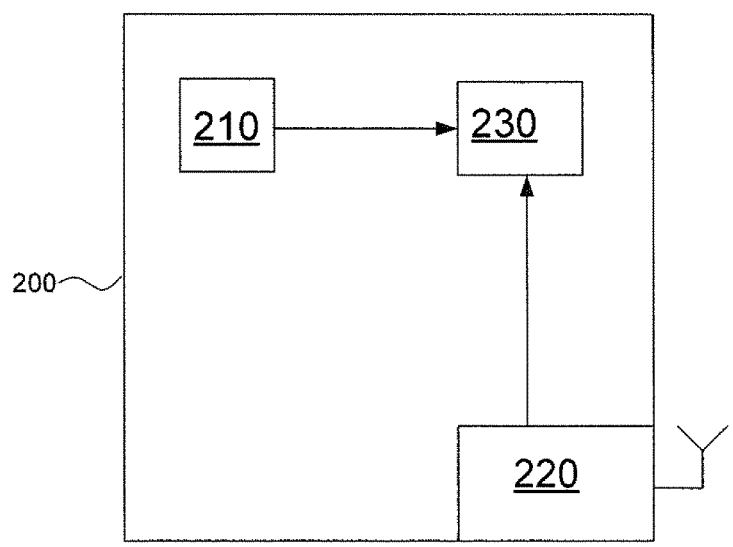
FIG. 2 illustrates a laser beam detector of an embodiment.

Next, the laser beam detector illustrated in FIG. 2 is explained in more detail. FIG. 2 represents elements of the laser beam detector 200 for detecting light of a laser beam rotating around a rotation axis according to an embodiment of the invention, comprising the photo detector 210, the receiver 220 and the determinator 230.

The photo detector 210 is configured to output a detection signal when irradiated by laser light. That is, the photo detector may at least comprise one photo detector element comprising a photodiode, for example.

In a specific embodiment, the laser beam detector 200 may have a photo detector 210 having a structure such as presented in WO 2006/048007 A1 which is herewith incorporated by reference. For example, as in the case of WO 2006/048007 A1, the photo detector 210 may comprise two photodiodes placed at the ends of a light conducting rod or light bar. Such a photo detector construction enables light detection over several centimeters by using merely two photodiodes. Alternatively, the photo detector 210 may comprise a simple linear array of photo detector elements or the photo detector 210 may be structured as discussed in WO 2009/154625 A1, which is also incorporated by reference.

It is to be understood that the photo detector 210 outputs a detection signal when irradiated by laser light usually independent of the specific laser device emitting the laser light, since the laser devices used on a construction site use light of similar wavelengths. Further, as indicated above, a rotating laser beam of a single laser device triggers a sequence of detection signals, e.g. a laser beam rotating with 600 rpm impinging on the photo detector 600 times per minute gives out a sequence of detection signals corresponding to the rotation pattern with rotation speed 600 rpm.

To indicate to the laser beam detector 200 what kind of rotation pattern to expect, the laser beam detector comprises the receiver 220 receiving from the laser device 100 the communication signal providing information about the rotation pattern used by the laser device 100. In other words, the receiver 220 receives a "fingerprint" of the laser device 100 via the communication signal, for which the laser beam detector 200 can then search for in a sequence of detection signals.

In detail, the receiver 220 is configured to receive a communication signal from the transmitter 140 of the laser device 100 over an interface, preferably a radio interface, wherein the communication signal provides information about the rotation pattern of the rotating laser beam. In particular, the information is a prediction of the rotation behavior according to which the optical element will be controlled by the controller of the laser device 100.

Similar to the above discussion with respect to the transmitter 140, the receiver 220 may be a radio receiver if a radio interface is used and may be configured as a transceiver if it comprises bidirectional communication functions such as requesting for information from the laser device 100 or sending out an acknowledgement that a communication signal was received.

Accordingly, the receiver 220 obtains an indication of the rotation pattern which is associated with the sequence of detection signals, wherein the received information and the sequence of detection signals can then be used to see whether the received rotation pattern indicated in the communication signal is included the sequence of detection signals which would indicate that the light detected is from the same laser device which sent the communication signal.

In detail, the determinator 230 determines whether the laser light belongs to the laser beam emitted by the laser device 100 by comparing a pattern effected by a sequence of detection signals from the photo detector 210 with the information about the rotation pattern of the rotating laser beam provided by the communication signal received by the receiver 220.

In other words, the determinator 230 analyzes the sequence of detection signals from the photo detector 210 by trying to find a pattern which matches the rotation pattern indicated in the communication signal. Once a match is obtained, the laser beam detector 200 identified the laser device which emitted the laser light.

In one embodiment, the determinator 230 is configured to continuously compare the pattern effected by the sequence of detection signals with the information about the rotation pattern of the rotating laser beam provided by the communication signal from the laser device. For continuously comparing, it might be sufficient to compare at least every 30 seconds whether a pattern can be found in the detection signals which corresponds to the rotation pattern previously obtained from the communication signal transmitted by the transmitter 140. If a match is found, the laser beam detector 200 can lock on the laser device 100 so as to form a laser device/laser beam detector pair, such as the one illustrated in FIG. 5.

To be able to continuously compare the patterns, it may be necessary to continuously receive a communication signal with an indication of the rotation pattern over the interface while the laser beam is rotating. However, it can be understood from the above explanation of possible information elements contained in the communication signal that the communication signal may comprise information explaining how the rotation pattern is changing over a certain time span, such as several minutes. An example showing how a rotation pattern can change over time is discussed with respect to FIG. 6 below.

In one embodiment, the determinator 230 obtaining information from the photo detector 210 and from the receiver 220 as indicated in FIG. 2 is configured to derive the rotation speed of the rotating laser beam at a specific time from the pattern effected by the sequence of detection signals or/and derive an acceleration of the rotation from the pattern effected by the sequence of detection signals. Alternatively or additionally, the determinator 230 is configured to derive an increase in the rotation speed of the rotating laser beam to a first predetermined value and then a decrease in the rotation speed to a second predetermined value.

If in addition to the light of the laser device 100 having the rotation speed of 600 rpm, for example, laser light of another laser device hits the photo detector, the sequence of detection signals becomes a complex convolution of more than one rotation pattern.

In detail, when laser light of two laser devices is received at the same time by the laser beam detector, the number of hits, i.e. resulting detection signals will double, assuming that both laser devices operate roughly within the range of 600 rpm. Therefore, an ambiguity may occur and the sequence of detection signals cannot easily be attributed to one laser device.

One simple way to overcome this ambiguity is to set laser devices in the proximity of the laser beam detector to mask mode. In mask mode laser light is not emitted over 360° of the full circle indicated by the rotating laser beam. For example, the laser unit does not constantly emit light in the 360° circle but only in a segment of the circle, such as 90°, which should help to avoid reception of laser light of an uninvolved laser device.

On the other hand, when using a photo detector based on a linear array of photodiodes or a photo detector based on the light conducting rod with two diodes discussed above, two different rotating laser beams can be usually distinguished because they do not hit the photo detector at the same position/height (if placed vertically). For example, in a linear diode array, the rotating laser beam of one laser device may only trigger the third photodiode, whereas the other laser device may trigger the fifth photodiode so that laser light of two laser devices can be distinguished by the position of the photodiode.

Even if the laser light of two laser devices hits the same photodiode, the detection signals triggered by the different laser lights may be distinguished by choosing one detection signal as starting point and lock on following detection signals corresponding to the expected pattern which was obtained previously in the communication signal predicting the future behavior of the rotation speed and thus when the light should hit the photo detector.

A summary of operations which may be carried out by the laser beam detector 200 of FIG. 2 for identifying light of a laser beam rotating around a rotation axis is given in the following by referring to FIG. 4.

Figure 4:
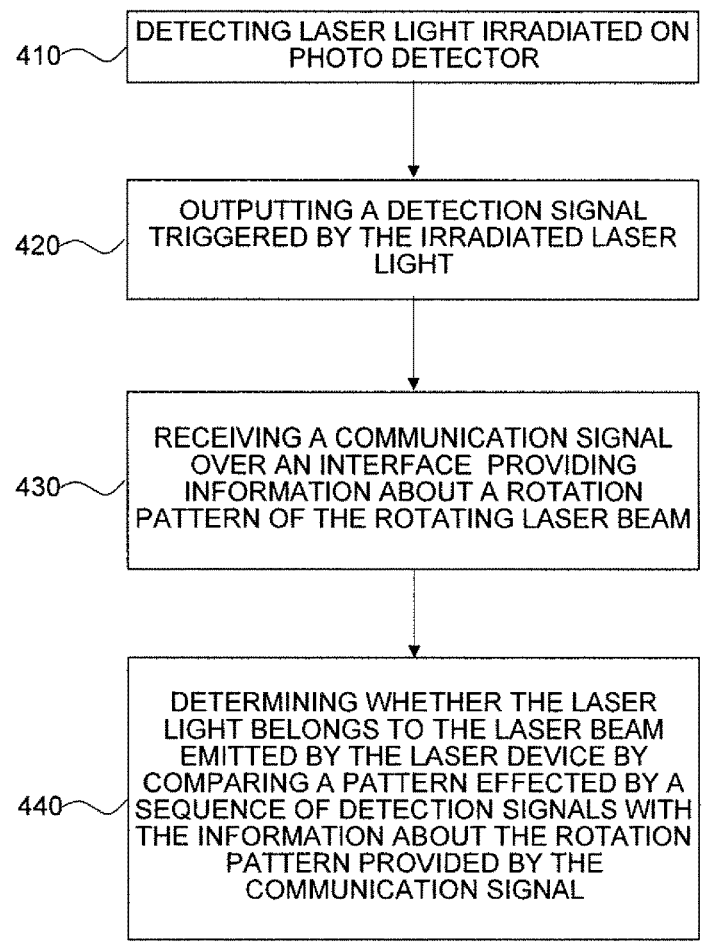
FIG. 4 illustrates steps of a method for identifying light of a laser beam rotating around the propagation axis.

FIG. 4 is a flowchart illustrating a method having steps 410 to 440 which may be carried out by/in the laser beam detector 200.

In a first step 410 the laser light of a laser device irradiated on a photo detector is detected. Regarding the specific structure of suitable photo detectors, it is referred to the above discussion of the photo detector 210 above.

In a second step 420 a detection signal triggered by the irradiated laser light is output. In more detail, every hit of irradiated laser light on the photo detector may trigger a detection signal so that a rotating laser beam repeatingly passing over the photo detector results in a sequence of detection signals.

In a third step 430 a communication signal sent over an interface providing information about a rotation pattern of the rotating laser beam may be received at the same time or shortly before the sequence of detection signals is obtained and output.

In a fourth step 440 of FIG. 4 it is then determined whether the laser light belongs to the laser beam emitted by the laser device by comparing a pattern effected by the sequence of detection signals with the information about the rotation pattern provided by the communication signal. If the patterns match, the laser light should belong to the same laser device which transmitted the communication signal.

In FIG. 5, a laser system is illustrated comprising the laser device 500 and the laser beam detector 200. The laser device 500 is similar to the laser device 100 but explains the controlling aspects in the laser device in more detail.

As can be seen in FIG. 5, the controller 550 controls the functions of the laser device 500 which is indicated by arrows. The first arrow connects the controller 550 to the laser unit 110 indicating that the controller 550 turns the laser unit 110 on and off. In a simple mode the laser unit 110 is always on to emit a laser beam when the optical element 120 is rotating. However, there may be cases where it is preferred to switch the laser unit 110 off from time to time. In particular, when operating in mask mode switching off the laser unit or otherwise blocking laser light at certain times to enable laser light to only be emitted in the segment of a circle and not the full 360° of the circle is preferable.

Further, it is shown by an arrow that the controller 550 controls the optical element 120, for example, by driving an electromotor which is connected by a support unit with the optical element 120 so that the electromotor drives the rotation of the optical element 120.

Still further, the controller 550 may decide about the rotation pattern and before making the optical member 120 to rotate according to the planned rotation pattern, information about the rotation pattern can be provided to the transmitter 140. The transmitter 140 then transmits the information about the rotation pattern in a communication signal over a radio interface to a receiver 220 of the laser beam detector 200. At the laser beam detector the receiver 220 then forwards this information to the determinator 230 which will compare whether the obtained rotation pattern is reflected in a sequence of detection signals obtained and output from the photo detector 210 to the determinator 230.

For example, to obtain a highly unique pattern, the laser device 500, and in particular the controller 550, may comprise a random number generator to generate a random number and to adapt the rate of change of the rotation speed, i.e. the acceleration of the rotation, to the random number. Hence, the rotation pattern will depend on a random number selection making the pattern essentially unique.

In the following, a specific pattern and information obtained with a communication signal are discussed by referring to FIG. 6.

Figure 6:
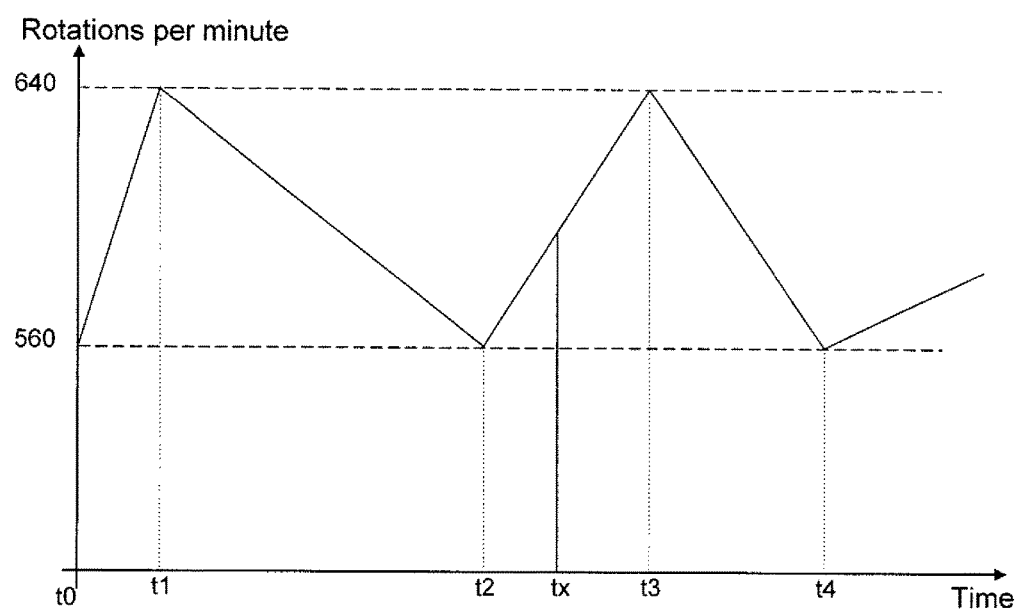
FIG. 6 illustrates an example of a pattern according to which the rotation speed of a laser beam is changed.

FIG. 6 illustrates an example of a pattern according to which the rotation speed of a laser beam is changed. For example, this pattern illustrated in FIG. 6 may be communicated in a communication signal from the laser device 100 or 500 to the laser beam detector 200.

At the same time, the controller 550 may use this pattern to control the optical element 120, namely to start at time t0 to increase the rotations per minute from 560 rpm to reach 640 rpm at time t1 and then to decrease the rotation speed again to 560 rpm at time t2. Subsequently, it is indicated in FIG. 6 that the rotation speed can be increased again to 640 rpm but now in a time period between t2 and t3 which is longer than the time period between t0 and t1 which may be 1-5 seconds. When 640 rpm is reached at time t3 the rotation speed is decreased again to 560 rpm which should be reached at time t4, after which the rotation speed is increased again.

Accordingly, the receiver 210 of the laser beam detector 200 may continuously obtain the following information over the radio interface between the laser device and the laser beam detector. For example, the present rotation speed, a sign of acceleration and a certain point in time at which the sign of acceleration changes may be continuously transmitted to the receiver of the laser beam detector, e.g. at each minimum and maximum value of rotation or every couple seconds, such as 2 or 3 seconds.

With this information at time tx, the following can be calculated, a present rotation speed of approximately 600 rpm, the information that the rotation speed increases at tx and that at t3 the acceleration changes its sign. Preferably a new point in time when the next change in sign occurs should then be conveyed.

By obtaining the above-mentioned information at the receiver, it is thus possible for the laser beam detector to check the present rotation speed at time tx, to check the sign of the change in rotation speed shortly afterwards as well as the rate of change (slope) of the rotation speed. Further, it is possible to check whether the expected change in sign in acceleration at time t3 occurs.

Accordingly, using the above-mentioned criteria, it is possible after a short examination of the received communication signal to carry out an unambiguous matching between the laser device and the laser beam detector.

From the data shown in FIG. 6, it can be expected that the optical element was controlled to change the rotation speed of the rotating laser beam to a predetermined value. In particular, it can be expected that the optical element is controlled to increase the rotation speed of the rotating laser beam to a first predetermined value, such as increasing it to 640 rpm and then to decrease the rotation speed to a second predetermined value, such as decreasing it to 560 rpm.

In particular, the illustrated changes may result from the generation of random numbers and from the adaptation of a rate of change of the rotation speed to a random number. Instead of using the random number to indicate a rate of change of the rotation speed, the random number could be used to indicate when a change in sign has to occur. In the example of FIG. 6, the maximal and minimal rotation speeds are fixed so that rate of change determines when the maxima or minima is reached.

In one embodiment, the controller 550 and/or determinator 230 and their functions can be implemented in the form of a computer, a field programmable gate array or integrated circuit, such as, for example an ASIC (Application Specific Integrated Circuit) or software or an appropriate combination of the above, although it is not limited to such. At least some functions can be embodied as a software program, and implemented by a microprocessor or other circuits and a memory, such as, for example, any type or RAM, ROM, hard disc, EEPROM, flash memory, etc. A program code that is stored in the memory can be a program with instructions designed to cause the microprocessor or other circuits to carry out the above functions.

At the same time a program code may include instructions adapted to cause data processing means, such as the microprocessor, to control operations of the methods of FIGS. 3 and 4. In particular, to control the emission of a laser beam, control rotating the laser beam around an axis by an optical element and control the transmission of a communication signal over an interface from the laser device to a receiver. Similar control operations may be used in the laser beam detector, namely laser light irradiated on a photo detector may be detected and a detection signal may be outputted and a communication signal received. Once this information is obtained, it is determined by the controller whether the laser light belongs to the laser beam emitted by the laser device by comparing a pattern effected by a sequence of detection signals with the information about the rotation pattern provided by the communication signal.

It is recognized that various modifications and variations of the described laser devices and laser beam detectors as well as the corresponding methods are possible without leaving the scope of the invention.

The invention has been described in reference to certain embodiments and examples which are intended to be illustrative and not limiting. The skilled person recognizes that numerous different combinations of hardware, software and firmware are appropriate for carrying out the invention, and that implementations and structures can be used for obtaining a suitable laser device and laser beam detector.

Other implementations of the invention will become apparent to the skilled person when considering the description and the embodiments of the invention disclosed herein. It is provided that the description and the examples must be considered merely exemplary. Therefore, it should be recognized that the inventive aspects lie in fewer than all of the features of the above disclosed implementations and configurations. Thus, the true scope of the invention is presented in the following claims.

The invention claimed is:

1. A laser device for supporting work on a construction site, the laser device comprising: a laser unit configured to emit a laser beam; an optical element arranged to rotate the laser beam around a rotation axis at a rotation speed; and a transmitter configured to transmit a communication signal including the rotation speed of the laser beam over an interface to a receiver of a laser beam detector at a plurality of transmission times, wherein the plurality of transmission times include each time the rotation speed is at a maximum or a minimum.

2. The laser device of claim 1, further comprising:
a controller configured to increase or decrease the rotation speed of the laser beam.

3. The laser device of claim 1, wherein the communication signal includes a sign of an acceleration of the rotation.

4. The laser device of claim 1, wherein the optical element is controlled to change the rotation speed of the rotating laser beam to a predetermined value.

5. The laser device of claim 4, wherein the optical element is controlled to increase the rotation speed of the rotating laser beam to a first predetermined value and then to decrease the rotation speed to a second predetermined value.

6. The laser device of claim 4, further comprising:
a random number generator configured to generate a random number and to adapt a rate of change of the rotation speed to the random number.

7. A laser system comprising the laser device of claim 1 and the laser beam detector.

8. A method for supporting work on a construction site, the method comprising: emitting a laser beam by a laser unit of a laser device; rotating the laser beam around a rotation axis at a rotation speed by an optical element; and transmitting a communication signal including the rotation speed of the laser beam over an interface from the laser device to a receiver of a laser beam detector at a plurality of transmission times, wherein the plurality of transmission times include each time the rotation speed is at a maximum or a minimum.

9. A program including instructions adapted to cause data processing means to control the method of claim 8.

10. A computer readable medium in which a program is embodied which causes a computer to execute the method of claim 8.

* * * * *